May 30, 1967     F. J. CLAWSON ET AL     3,322,146

FLUID FLOW CONTROLLING DEVICE

Filed Oct. 14, 1964

INVENTORS
FLOYD J. CLAWSON
MICHAEL C. DE STEFANO

BY *Irons, Birch, Swindler & McKie*

ATTORNEYS.

United States Patent Office 3,322,146
Patented May 30, 1967

3,322,146
FLUID FLOW CONTROLLING DEVICE
Floyd J. Clawson, Nashville, Tenn., and Michael C. De Stefano, Lakeland, Fla.; said Clawson assignor to Unifab, Inc., Camden, Tenn., a corporation of Tennessee
Filed Oct. 14, 1964, Ser. No. 403,730
2 Claims. (Cl. 137—576)

This invention relates to fluid flow controlling devices and more particularly, to a fluid flow controlling device for automatically maintaining a constant level of fluid in a receptacle.

In many different manufacturing processes and operations, it is desirable to automatically maintain a constant level of a fluid, which may be a liquid, in a sump, tank or other form of receptacle. At present, such fluid or liquid level controlling is ordinarily effected by mechanical regulators controlled by relatively complex float mechanisms, valving apparatus, or other complex means. The heretofore known fluid flow controlling devices are usually expensive and require considerable attention and maintenance during use. Often the proper operation of such a device depends upon constant attention to guard against mechanical failure, uncontrolled overflow, and other similar problems.

To overcome the disadvantages of the prior art, it is an object of the present invention to provide an improved fluid flow controlling device which will automatically maintain a substantially constant level of liquid in a receptacle without requiring any supervision or maintenance during use.

Another object of the invention is to provide such an improved fluid flow controlling device which is inexpensive and simple in design.

In general, the invention relates to a fluid flow controlling device for automatically maintaining a constant level of fluid in a receptacle comprising a flow box positioned adjacent the receptacle, weir means dividing said box into a delivery chamber and an overflow chamber, said delivery chamber having an orifice communicating with the receptacle at a lesser height than the top of said weir means, fluid inlet means communicating with said delivery chamber, and fluid outlet means communicating with said overflow chamber.

The invention having been broadly described, a specific embodiment thereof will now be set forth in detail with reference to the accompanying drawings in which.

Figure 1:
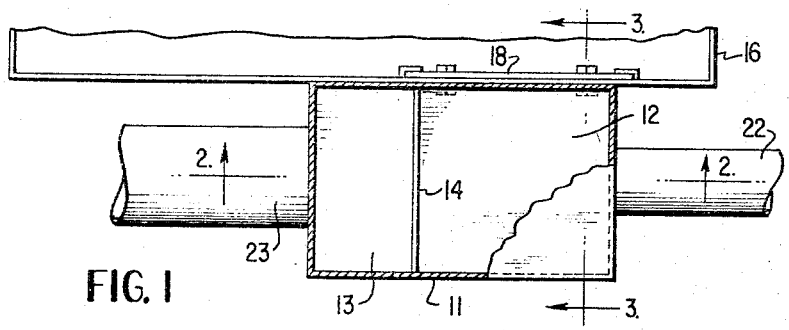
FIGURE 1 is a top plan view of a fluid flow controlling device according to the present invention showing a flow box mounted adjacent a receptacle.
Figure 2:
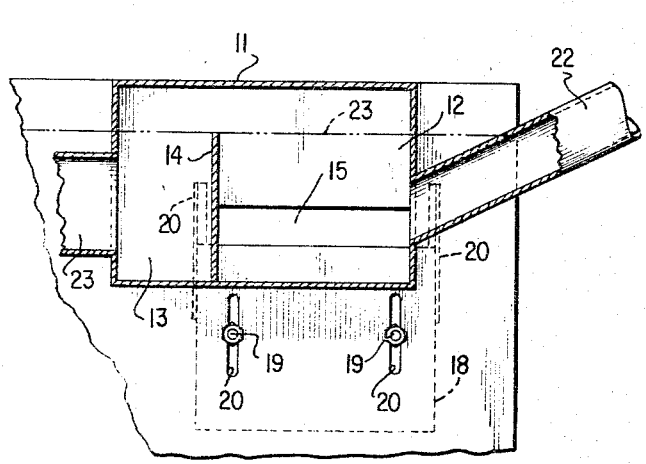
FIGURE 2 is a vertical section taken on line 2—2 of FIGURE 1.
Figure 3:
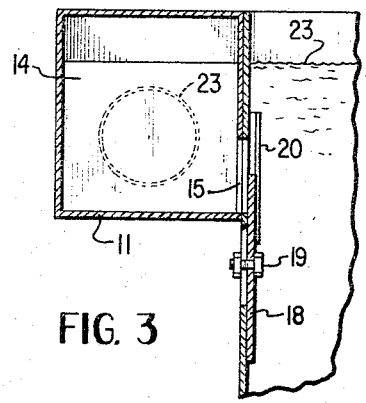
FIGURE 3 is a vertical section taken on line 3—3 of FIGURE 1.
Figure 4:
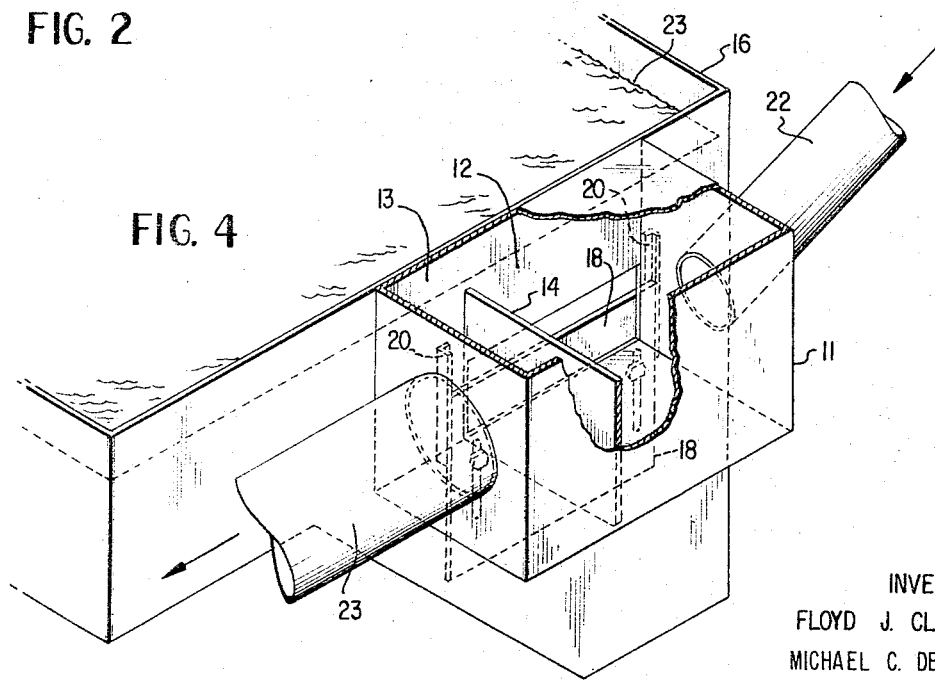
FIGURE 4 is a perspective view of a fluid flow controlling device according to the present invention.

Illustrated in the drawings is a flow box 11 divided into a delivery chamber 12 and an overflow chamber 13 by a fixed vertical partition or overflow weir 14. The flow box 11 may be rectangular in configuration and preferably is covered at the top to prevent any liquid from spilling or splashing out. As most clearly shown in FIGURE 2, the weir 14 is of a lesser height than the flow box to provide room between the top of the flow box and the top of the weir for liquid to overflow from the delivery chamber 12 to the overflow chamber 13.

The delivery chamber 12 is provided with an orifice or opening 15 communicating with a sump, tank or other receptacle 16 to permit liquid from the delivery chamber to flow into the receptacle. Although the orifice 15 may be of any configuration, it is preferably constructed in the form of a rectangular opening, as shown in the drawings. The orifice 15 is positioned in one side wall of the flow box 11 at a lesser height than the top of the overflow weir 14 for reasons to be set forth more fully hereinafter.

The receptacle 16 is also provided with an orifice or opening 17 in one side wall thereof communicating with the orifice 15 to permit liquid from the delivery chamber of the flow box to flow into the receptacle.

Any suitable means, such as the plate member 18, may be provided to vary the size of the orifices or openings 15 and 17. In the form of the invention illustrated in the drawings, the plate member 18 is attached to a side wall of the receptacle 16 by means of nut and bolt assemblies 19 and bracket members 20. The nut and bolt assemblies 19 are positioned in generally elongated slots 20 in the side wall of the receptacle 16 to permit plate member 18 to be vertically adjusted to vary the sizes of the openings 15 and 17.

Communicating with the delivery chamber 12 through an end wall of the flow box 11 is any suitable inlet means, such as conduit 22. Similarly, any suitable fluid outlet means, such as conduit 23 may be provided in an opposite end wall of flow box 11 to discharge liquid from the overflow chamber 13.

It is to be noted that flow box 11 is positioned adjacent the receptacle 16 near the top thereof so that the top of the overflow weir 14 is at approximately the height at which it is desired to maintain the elevel of the liquid in the receptacle. The level of the liquid in the receptacle is generally indicated by the numeral 23. As shown in the drawings, the fluid inlet means 22 extends downward to the flow box 11 from a height above the level at which it is desired to maintain the liquid in the receptacle 16 so that the pressure head of the liquid entering through the conduit 22 will be greater than the pressure head of the liquid in the receptacle.

In operation of the fluid flow controlling device of the present invention, liquid is supplied to the delivery chamber 12 of flow box 11 through conduit 22 at a pressure head greater than the pressure head of the liquid contained in the sump. The liquid in the delivery chamber 12 will then flow into the receptacle 16 through the openings 15 and 17 until the liquid in the receptacle is at the desired level, which is substantially equal to the height of the weir 14. When the liquid in the receptacle 16 is at approximately the same height as the overflow weir 14, the pressure head created by the liquid in the receptacle will be sufficient to preclude any liquid from entering the receptacle from the delivery chamber 12 of the flow box 11, since the liquid will take the easiest path and overflow over the top of the weir 14 into the overflow chamber 13. From the overflow chamber 13, any excess liquid then may be flowed out through the fluid outlet means 23.

The fluid flow controlling device of the present invention operates on a pressure principle. If a sufficient volume of liquid is contained in the receptacle, the pressure head created by the liquid will be sufficient to preclude any liquid from the delivery chamber of the flow box from entering into the receptacle, since the liquid will take the easiest path and overflow over the top of the overflow weir. Conversely, since the pressure head of the liquid in the flow box remains substantially constant due to the continuous supply of fluid thereto through the conduit 22, the liquid from the receptacle is precluded from entering the delivery chamber of the flow box. It will be understood that the volume of liquid supplied to the flow box through the fluid inlet means 22 is always sufficient to maintain a substantially constant pressure head therein in order to supply liquid to the receptacle when needed.

The fluid flow controlling device of the present invention has particular application in operations where it is necessary to maintain a substantially constant level of liquid in a receptacle during various phases of the operation, such as is often necessary in the beneficiation of minerals. The maintaining of a constant volume of liquid in a receptacle in such operations is advantageous in that it permits a volume of liquid to be discharged from the receptacle at all times under constant volume and pressure. It will be understood that the volume of flow of liquid entering through the fluid inlet means is always greater than the maximum volume of flow of liquid which may be discharged from the receptacle.

The fluid flow controlling device of the present invention is further advantageous in that it is entirely automatic in operation, thus requiring no supervision. When the level of the liquid in the receptacle is at the desired level, the liquid in the flow box merely overflows over the top of the overflow weir 14 into the overflow chamber 13 and out through the fluid outlet means 23. It is further to be noted that the device of the present invention is extremely simple in construction, thus eliminating the necessity for complex mechanical regulators such as floats and valves. This, of course, makes the device extremely economical to construct and use.

Although the present invention has been illustrated and described with reference to a specific embodiment, it will be understood that various modifications may be made by persons skilled in the art without departing from the spirit of the invention which is defined solely by the appended claims.

What is claimed is:

1. A fluid flow controlling device for automatically maintaining a constant level of fluid in a receptacle comprising
a flow box positioned adjacent the receptacle, said flow box being constructed as a separate element apart from the receptacle,
weir means dividing said box into a delivery chamber and an overflow chamber, said weir means being of a height substantially equal to the level at which the fluid in the receptacle is to be maintained,
fluid inlet means communicating with said delivery chamber through a sidewall thereof,
fluid outlet means communicating with said overflow chamber,
said delivery chamber having an orifice communicating with the receptacle at a lesser height than the top of said weir means to permit fluid from the delivery chamber to flow into the receptacle, and
said fluid inlet means being capable of providing a fluid pressure head greater than the pressure head created by the fluid in the receptacle to cause said fluid to flow into the receptacle until the level of the fluid therein is substantially equal to the height of said weir means and to preclude said fluid in the receptacle from returning to said delivery chamber to thereby maintain the level of the fluid in the receptacle constant.

2. A fluid flow controlling device for automatically maintaining a constant level of fluid in a receptacle comprising
a flow box positioned adjacent the receptacle, said flow box being constructed as a separate element apart from the receptacle,
weir means dividing said box into a delivery chamber and an overflow chamber, said weir means being of a height substantially equal to the level at which the fluid in the receptacle is to be maintained,
fluid inlet means communicating with said delivery chamber through a sidewall thereof,
fluid outlet means communicating with said overflow chamber,
said delivery chamber having an orifice communicating with the receptacle at a lesser height than the top of said weir means to permit fluid from the delivery chamber to flow into the receptacle,
an adjustable plate member slidably mounted on a wall of the receptacle adjacent said flow box for varying the size of said orifice,
bolt means for mounting said plate member on said wall of the receptacle, said bolt means being slidably received within slots in said wall of the receptacle, and
said fluid inlet means being capable of providing a fluid pressure head greater than the pressure head created by the fluid in the receptacle to cause said fluid to flow into the receptacle until the level of the fluid therein is substantially equal to the height of said weir means and to preclude said fluid in the receptacle from returning to said delivery chamber to thereby maintain the level of the fluid in the receptacle constant.

References Cited

UNITED STATES PATENTS

| | | | |
|---|---|---|---|
| 950,138 | 7/1909 | Kinser | 61—29 |
| 1,202,050 | 7/1914 | Gamble | 137—576 X |
| 1,838,710 | 12/1931 | Schur | 137—576 X |
| 1,966,638 | 7/1934 | Morgan | 137—92 |

M. CARY NELSON, *Primary Examiner.*

MARTIN P. SCHWADRON, *Examiner.*

R. J. MILLER, *Assistant Examiner.*